United States Patent
Nonaka et al.

(10) Patent No.: US 11,022,842 B2
(45) Date of Patent: Jun. 1, 2021

(54) PLANAR LIGHT SOURCE DEVICE AND DISPLAY DEVICE

(71) Applicant: Enplas Corporation, Saitama (JP)

(72) Inventors: Ryo Nonaka, Saitama (JP); Kyouhei Yamada, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 16/650,386

(22) PCT Filed: Dec. 5, 2017

(86) PCT No.: PCT/JP2017/043666
§ 371 (c)(1),
(2) Date: Mar. 25, 2020

(87) PCT Pub. No.: WO2019/064614
PCT Pub. Date: Apr. 4, 2019

(65) Prior Publication Data
US 2020/0225536 A1  Jul. 16, 2020

(30) Foreign Application Priority Data

Sep. 26, 2017 (JP) .............................. JP2017-185192
Nov. 15, 2017 (JP) .............................. JP2017-219986

(51) Int. Cl.
*G02F 1/13357* (2006.01)

(52) U.S. Cl.
CPC .. *G02F 1/133606* (2013.01); *G02F 1/133603* (2013.01); *G02F 1/133608* (2013.01); *G02F 1/133611* (2013.01)

(58) Field of Classification Search
CPC ......... G02F 1/133603; G02F 1/133606; G02F 1/133608; G02F 1/133611; F21V 5/00; F21V 52/00
See application file for complete search history.

(56) References Cited

U.S. PATENT DOCUMENTS 9,104,015 B2 * 8/2015 Matsuki ............. G02B 19/0066
2008/0000242 A1 1/2008 Jung
(Continued)

FOREIGN PATENT DOCUMENTS

JP 2008-10693 1/2008
JP 2012-243396 12/2012
(Continued)

OTHER PUBLICATIONS

International Search Report and the Written Opinion dated Jan. 23, 2018 From the International Searching Authority Re. Application No. PCT/JP2017/043666 and Its Translation of Search Report Into English. (7 Pages).

*Primary Examiner* — Zheng Song (57) ABSTRACT

A planar light source device has: a housing, a substrate, a plurality of light-emitting devices each having a light-emitting element and a light-beam control member; and a light diffusing member. The housing has: a bottom surface and two inclined surfaces. In the light distribution characteristics of a light-emitting device, a light ray with the largest angle relative to the optical axis in an angular range within which a luminous intensity equal to or more than 70% of the maximum luminous intensity is exhibited reaches the inclined surfaces. A first angle between the optical axis of the light-emitting element and a light ray having the maximum luminous intensity emitted from the light-emitting device is larger than a second angle between the optical axis of the light-emitting element and a straight line connecting the luminescence center of the light-emitting element to the opening-side end portion of the housing.

5 Claims, 8 Drawing Sheets (56) References Cited

U.S. PATENT DOCUMENTS

| | | | |
|---|---|---|---|
| 2012/0106168 A1* | 5/2012 | Matsuki | G02B 19/0014 |
| | | | 362/311.02 |
| 2012/0140146 A1* | 6/2012 | Baba | G02F 1/133606 |
| | | | 349/62 |
| 2012/0287375 A1 | 11/2012 | Matsuki et al. | |
| 2013/0201426 A1* | 8/2013 | Matsuki | G02B 19/0066 |
| | | | 349/64 |
| 2014/0218894 A1* | 8/2014 | Tanabe | G02F 1/133611 |
| | | | 362/97.2 |
| 2015/0049508 A1* | 2/2015 | Suzuki | G02F 1/133608 |
| | | | 362/611 |
| 2015/0369454 A1* | 12/2015 | Lee | G02F 1/133603 |
| | | | 362/97.1 |
| 2016/0018699 A1* | 1/2016 | Chae | G02F 1/133606 |
| | | | 349/67 |
| 2017/0123272 A1* | 5/2017 | Tanabe | F21V 5/04 |
| 2017/0322361 A1* | 11/2017 | Park | G02B 6/0053 |
| 2018/0059484 A1* | 3/2018 | Murai | G02F 1/133603 |
| 2018/0180943 A1* | 6/2018 | Sawanaka | G02F 1/133603 |
| 2019/0243172 A1* | 8/2019 | Gotou | G02F 1/133603 |

FOREIGN PATENT DOCUMENTS

| | | |
|---|---|---|
| JP | 2014-041844 | 3/2014 |
| JP | 2012-231023 | 12/2020 |
| WO | WO 2011/096192 | 8/2011 |
| WO | WO 2019/064614 | 4/2019 |

\* cited by examiner

PLANAR LIGHT SOURCE DEVICE AND DISPLAY DEVICE

TECHNICAL FIELD

The present invention relates to a surface light source device and a display device.

BACKGROUND ART

Some transmission type image display devices such as liquid crystal display devices use a direct surface light source device. In recent years, direct surface light source devices including a plurality of light emitting elements as the light source are used (see, for example, PTLs 1 and 2).

A backlight (surface light source device) described in PTL 1 includes a substrate, a reflective sheet, a plurality of light sources and an optical sheet (light diffusion member). Each of the plurality of light sources includes a light emitting diode (light emitting element) and a lens (light flux controlling member). The plurality of light sources are arranged on the substrate in one direction. In addition, the reflective sheet is formed so as to approach the optical sheet as the distance of the reflective sheet from the substrate increases.

A backlight light source module (surface light source device) described in PTL 2 includes a substrate, a reflective plate, an LED element (light emitting element), a transparent resin (light flux controlling member) and an optical sheet. The LED element and the transparent resin are disposed on the substrate. In addition, the LED element and the transparent resin are disposed on the substrate. Further, the reflective plate is formed so as to approach the optical sheet as the distance of the reflective plate from the substrate increases.

In the surface light source devices described in PTLs 1 and 2, a light beam having the maximum luminous intensity among light beams emitted from the light flux controlling member is emitted at an angle of approximately 60° to 80° with the direction along the optical axis of the light emitting element set as 0°. As a result, the majority of the light beams emitted from the light flux controlling member directly reach the light diffusion member.

The surface light source devices described in PTLs 1 and 2 thus uniformly illuminate the light diffusion member by causing majority of the light beams emitted from the light flux controlling member to directly reach the light diffusion member.

CITATION LIST

Patent Literature

PTL 1
Japanese Patent Application Laid-Open No. 2014-041844
PTL 2
Japanese Patent Application Laid-Open No. 2008-010693

SUMMARY OF INVENTION

Technical Problem

In the surface light source devices of PTLs 1 and 2, however, the light emission angle of the light beam which is emitted from the light flux controlling member and has the maximum luminous intensity is approximately 60° to 80°, and thus when the surface light source device is made thinner or larger, the external edge thereof may become a dark part. That is, a conventional surface light source device has a disadvantage such that uniformity on the light diffusion member decreases when the surface light source device is made thinner or larger.

An object of the present invention is to provide a surface light source device and a display device which have high uniformity even when the surface light source device is made thinner or larger.

Solution to Problem

A surface light source device of the present invention includes: a casing with an opening, the casing having a shape of a box, a substrate disposed in the casing; a plurality of light emitting devices arranged in one direction on the substrate; and a light diffusion member disposed so as to cover the opening, in which the plurality of light emitting devices each include: a light emitting element, and a light flux controlling member configured to control light distribution of light emitted from the light emitting element; and in which the casing includes: a bottom surface on which the substrate is disposed, and inclined surfaces which are disposed parallel to an array direction of the plurality of light emitting devices, the inclined surfaces being disposed on both sides of the bottom surface respectively; in which: in a cross section perpendicular to the array direction of the plurality of light emitting devices, each of the inclined surfaces is tilted so as to approach the light diffusion member as a distance of the inclined surface from the bottom surface increases, a light beam reaches the inclined surface directly, or is reflected once by the bottom surface and subsequently reaches the inclined surface, the light beam having a largest angle relative to an optical axis of the light emitting element in an angle range in which luminous intensities of 70% or more of a maximum luminous intensity are shown in light distribution characteristics of each of the light emitting devices, and a first angle is larger than a second angle, the first angle being an angle between the optical axis of the light emitting element and a light beam which is emitted from the light emitting device and has the maximum luminous intensity, the second angle being an angle between the optical axis of the light emitting element and a straight line that connects a light emission center of the light emitting element and an opening side end of the inclined surface.

A display device of the present invention includes the surface light source device of the present invention and a display member disposed on the light diffusion member.

Advantageous Effects of Invention

The surface light source device according to the present invention is capable of providing high uniformity even when the surface light source device is made thinner or larger.

DESCRIPTION OF EMBODIMENT

An embodiment of the present invention will be described in detail below with reference to the accompanying drawings.

(Configuration of Surface Light Source Device)

Figures 1A, 1B:
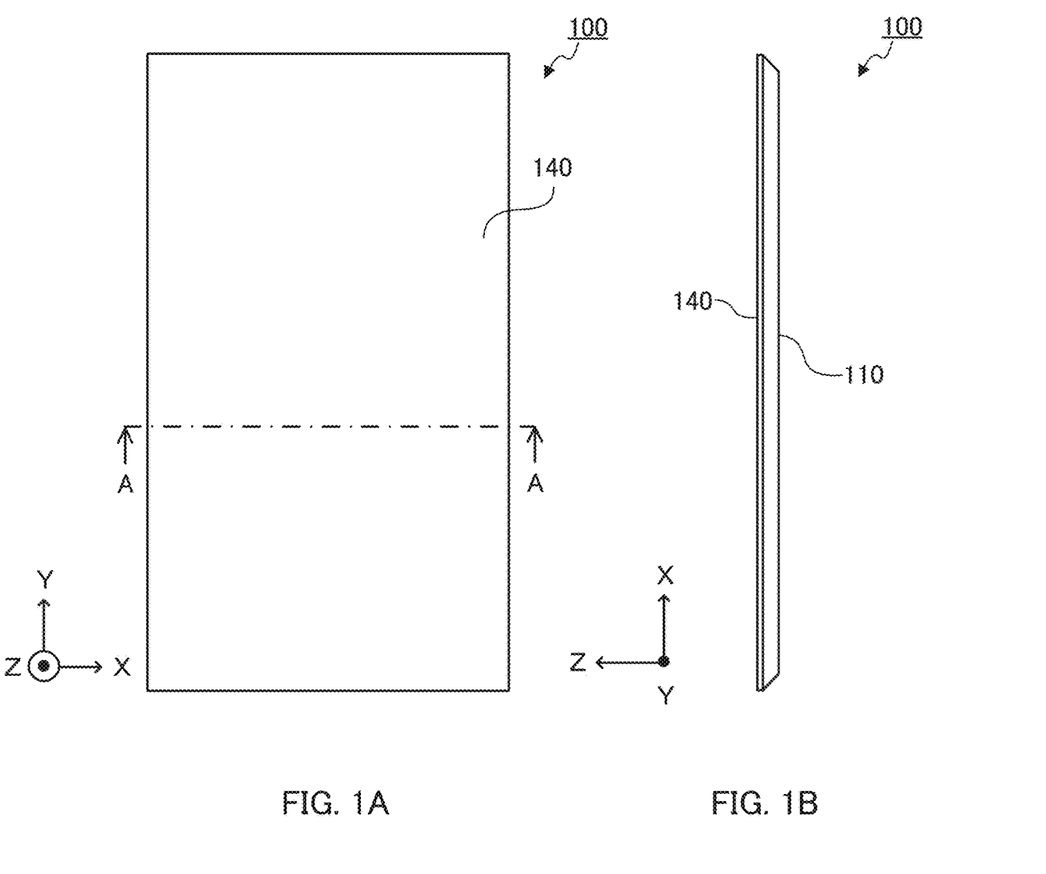
FIGS. 1A 1B and 1C illustrate a configuration of a surface light source device according to the present embodiment.
Figure 1C:
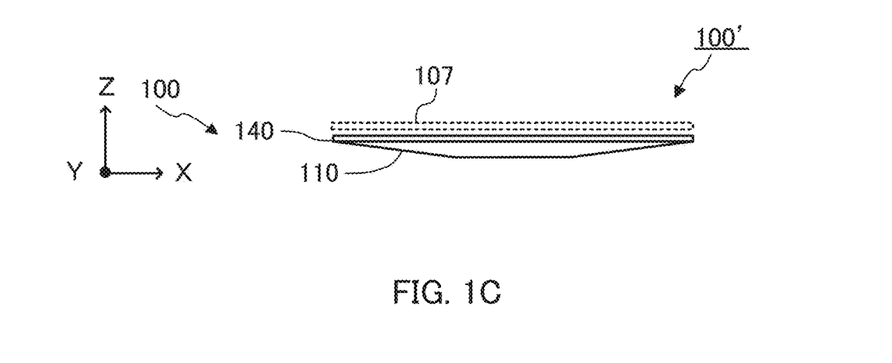
Figure 2A:
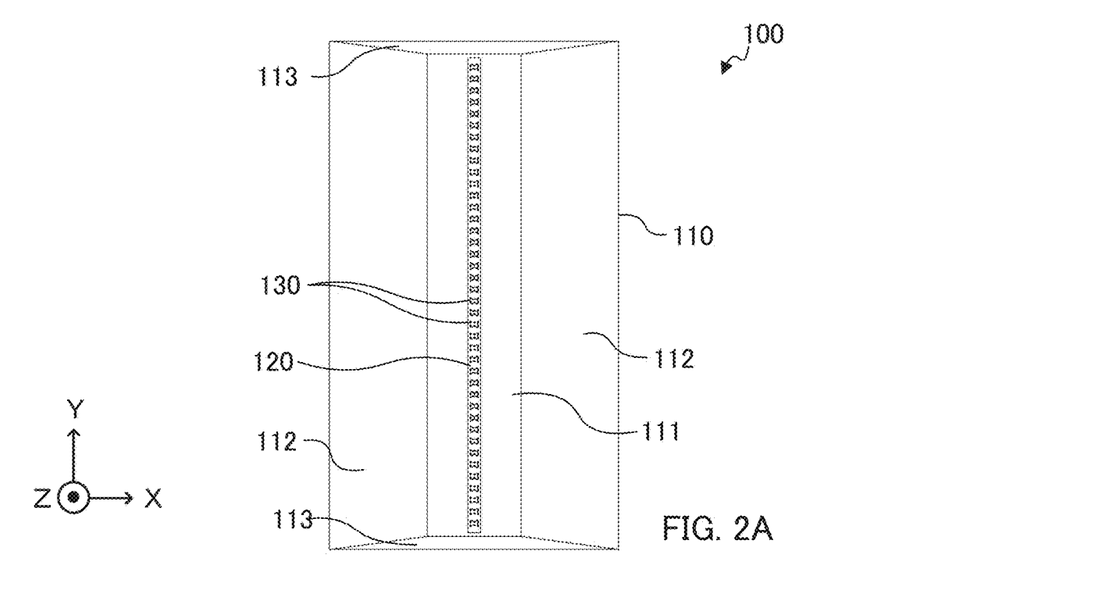
FIGS. 2A, 2B and 2C illustrate the configuration of the surface light source device according to the present embodiment.
Figure 2B:
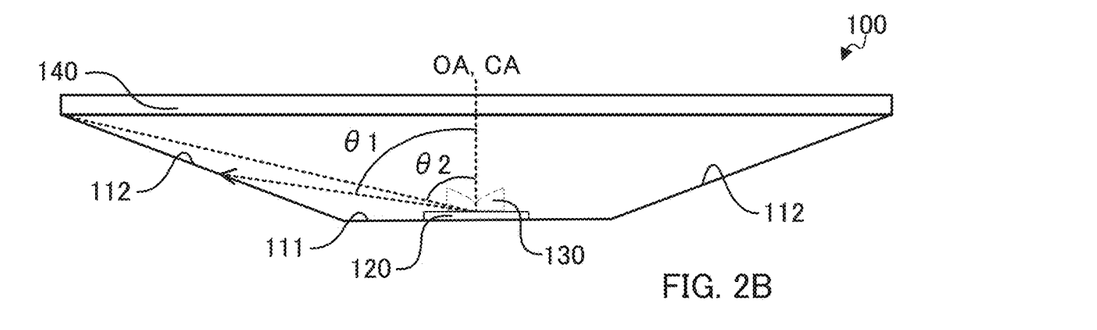
Figure 2C:
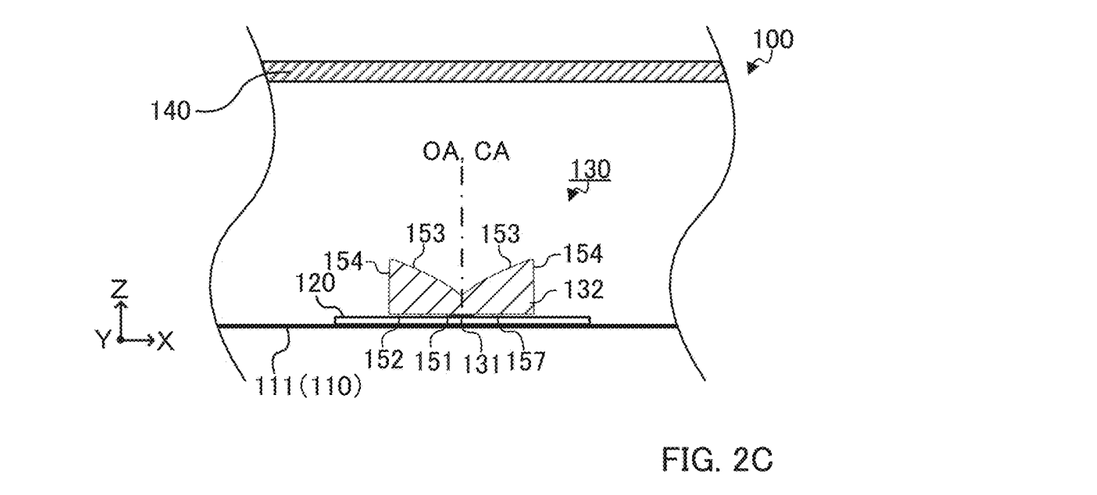

FIGS. 1A to 1C and 2A to 2C illustrate a configuration of surface light source device 100 according to Embodiment 1. FIG. 1A is a plan view of surface light source device 100, and FIG. 1B is a side view and FIG. 1C is a front view thereof. FIG. 2A is a plan view of surface light source device 100 of FIG. 1A with light diffusion member 140 removed, FIG. 2B is a schematic cross-sectional view of surface light source device 100, FIG. 2C is a partially enlarged cross-sectional view taken along line A-A of FIG. 1A. In the following, the description is made with the direction parallel to optical axis OA of light emitting element 131 as Z direction, the array direction of light emitting devices 130 which is orthogonal to Z direction as Y direction, and the direction perpendicular to Z direction and Y direction as X direction. For a single light emitting device 130, the description is made with the axes, from the original that is the light emission center of light emitting element 131, in X direction, Y direction and Z direction as X axis, Y axis and Z axis, respectively.

As illustrated in FIGS. 1A to 1C and 2A to 2C, surface light source device 100 includes casing 110, substrate 120, a plurality of light emitting devices 130 and light diffusion member 140. In addition, as illustrated in FIG. 1C, surface light source device 100 may be used as display device 100' in combination with a display member (member to be irradiated) 107 such as a liquid crystal panel (shown by dotted line in FIG. 1C).

Casing 110 is a box with at least a part thereof is open and used for housing substrate 120 and the plurality of light emitting devices 130 inside. Casing 110 includes bottom surface 111, two first inclined surfaces (tilted surfaces) 112 and two second inclined surfaces 113.

Bottom surface 111 is a rectangular surface in plan view. Substrate 120 is disposed on bottom surface 111. Two first inclined surfaces 112 are respectively connected to two sides of bottom surface 111 in the transverse direction. Two second inclined surfaces 113 are respectively connected to two sides of bottom surface 111 in the longitudinal direction. In bottom surface 111, as long as a region with substrate 120 disposed thereon is flat, a region with no substrate 120 disposed thereon is not necessarily be disposed on the same plane as the region with substrate 120 disposed thereon.

Two first inclined surfaces 112 are disposed parallel to the array direction of the plurality of light emitting devices 130 and disposed on both sides of bottom surface 111 respectively with bottom surface 111 between two first inclined surfaces 112. In the cross section perpendicular to the array direction of the plurality of light emitting devices 130, first inclined surface 112 is tilted so as to approach light diffusion member 140 as the distance of first inclined surface 112 from bottom surface 111 increases. First inclined surface 112 may be a planar surface, a curved surface protruding toward light diffusion member 140 side or a curved surface concave relative to light diffusion member 140. The inclination angle of first inclined surface 112 relative to bottom surface 111 is preferably more than 6° and less than 9°, and more preferably 7° or more and less than 9°. When the inclination angle of first inclined surface 112 relative to bottom surface 111 is more than 6° and less than 9°, light emitted from light emitting device 130 and reflected by first inclined surface 112 widely reaches the external edge of light diffusion member 140.

In the present embodiment, the inclination angle of first inclined surface 112 relative to bottom surface 111 is set based on the opening edge of casing 110. That is, casing 110 does not include a side surface perpendicular to bottom surface 111 in the present embodiment. When the inclination angle of first inclined surface 112 relative to bottom surface 111 is large, the size of first inclined surface 112 becomes small. On the other hand, when the inclination angle of first inclined surface 112 relative to bottom surface 111 is small, the size of first inclined surface 112 becomes large.

In the array direction (Y direction) of the plurality of light emitting devices 130, second inclined surfaces 113 are disposed on both sides of bottom surface 111 respectively. Second inclined surface 113 is formed so as to approach light diffusion member 140 as the distance from bottom surface 111 increases. The inclination angle of second inclined surface 113 relative to bottom surface 111 is approximately 30° to 50°. Two second inclined surfaces 113 may be a planar surface, a curved surface protruding toward light diffusion member 140 side or a curved surface concave relative to light diffusion member 140.

As described above, in bottom surface 111, as long as a region with substrate 120 disposed thereon is flat, a region with no substrate 120 disposed thereon is not necessarily be disposed on the same plane as the region with substrate 120 disposed thereon. For a part of bottom surface 111 on one of two first inclined surfaces 112 side relative to light emitting device 130, the part may be tilted in the direction opposite to that of the one first inclined surface 112. In addition, for a part of bottom surface 111 on the other first inclined surface 112 side relative to light emitting device 130, the part may be tilted in the direction opposite to that of the other first inclined surface 112. That is, the gradients of the two first inclined surfaces 112 may be formed such that the respective normals of two first inclined surfaces 112 intersect on the front side of surface light source device 100, but two regions where substrate 120 is not disposed may be formed such that the respective normals of the regions intersect on the rear side of surface light source device 100. Such a configuration is capable of suppressing the vicinity of light emitting device 130 from becoming too bright.

With casing 110 in such a shape, the thickness of the surface light source device 100 seen from the outside can be reduced. The size of the opening of casing 110 corresponds to the size of the light emitting region formed on light diffusion member 140, and is, for example, 1200 mm×680 mm. Light diffusion member 140 covers the opening. The height from the surface of bottom surface 111 to light diffusion member 140 (i.e. thickness of the space) may be any value, and is approximately 10 to 40 mm. Casing 110 is formed of a material of, for example, a light-transmissive resin such as polymethylmethacrylate (PMMA) or polycarbonate (PC), or a metal such as stainless steel or aluminum.

Substrate 120 is disposed on bottom surface 111 of casing 110. Substrate 120 is a flat plate for disposing the plurality of light emitting devices 130 at predetermined intervals in casing 110. A light beam that reaches the surface of substrate 120 from light emitting device 130 is reflected by the surface toward light diffusion member 140.

The plurality of light emitting devices 130 are arranged in one direction (Y direction) on substrate 120. The plurality of light emitting devices 130 may be arranged in one row, or in more than one row. In both cases, each row is along Y direction. The distances between adjacent light emitting devices 130 in the array direction (Y direction) of the plurality of light emitting devices 130 may be the same or different. In the present embodiment, light emitting devices 130 are arranged on substrate 120 in one row along Y direction. In addition, the plurality of light emitting devices 130 are disposed at regular intervals in Y direction. The number of light emitting devices 130 disposed on substrate 120 is not limited. The number of light emitting devices 130 disposed on substrate 120 is appropriately set on the basis of the size of the light emitting region (light emitting surface) defined by the opening of casing 110.

Each of light emitting devices 130 includes light emitting element 131 and light flux controlling member 132. Each of light emitting devices 130 is disposed such that the optical axis (optical axis OA of light emitting element 131 described below) of light emitted from light emitting element 131 is set along the normal to the surface of substrate 120.

Among light beams emitted from light emitting device 130, light beams having a luminous intensity of 70% or more of the maximum luminous intensity in the light distribution characteristics of light emitting device 130 reach first inclined surface 112. By causing the light beams having a luminous intensity of 70% or more of the maximum luminous intensity in the light distribution characteristics to reach light diffusion member 140 after being reflected by first inclined surface 112 in a manner described above, the light emitted from light emitting device 130 is efficiently used as illuminating light of light diffusion member 140, and thus a bright surface light source device having high uniformity can be obtained. The description "a light beam having a luminous intensity of 70% or more of the maximum luminous intensity reaches first inclined surface 112" is a concept including a case where a light beam emitted from emission surface 154 in light emitting device 130 is reflected once by bottom surface 111, and subsequently reaches first inclined surface 112, and a case where a light beam reaches first inclined surface 112 without being reflected by bottom surface 111. As described above, it is necessary for light beams having a luminous intensity of 70% or more of the maximum luminous intensity to reach light diffusion member 140 via first inclined surface 112. When a light beam having a luminous intensity of 70% or more of the maximum luminous intensity is reflected by bottom surface 111 and illuminates light diffusion member 140 without reaching first inclined surface 112, light reflected by bottom surface 111 illuminates the vicinity of light emitting device 130, thereby causing formation of a bright part at the position. In addition, since a light beam having a luminous intensity of 70% or more of the maximum luminous intensity in the present embodiment has a large angle relative to optical axis OA, the incident angle of the light beam becomes large when the light beam reaches light diffusion member 140 directly, so that light diffusion member 140 cannot be illuminated brightly, and the light use efficiency may decrease. By reflecting a light beam on first inclined surface 112, the light beam can be used as illuminating light in the external edge region where the amount of light tends to be insufficient in the light emitting surface of surface light source device 100, and the incident angle of the light beam relative to light diffusion member 140 becomes small, so that light diffusion member 140 can be efficiently illuminated.

A method described in the following, for example, can confirm whether a light beam having the largest angle relative to optical axis OA in the angle range in which luminous intensities of 70% or more of the maximum luminous intensity are shown reaches first inclined surface 112 directly, or is reflected once by bottom surface 111 and subsequently reaches first inclined surface 112. Firstly, the light distribution characteristics of light emitting device 130 with the direction along optical axis OA set as 0° are analyzed. Secondly, obtained is angle θ, relative to optical axis OA, of a light beam that has a light intensity of 70% of the maximum luminous intensity and has an angle relative to optical axis OA being maximum. Thirdly, a cross-sectional view of surface light source device 100 is formed. The confirmation can be made by checking, when a straight line having angle θ is drawn from the end of emission surface 154 on light diffusion member 140 side, whether the straight line reaches first inclined surface 112 directly, or reaches first inclined surface 112 after being reflected once by bottom surface 111. In addition, when a straight line having angle θ is drawn from the end of emission surface 154 on bottom surface 111 side, it is preferred that the straight line reaches first inclined surface 112 directly, or reaches first inclined surface 112 after being reflected once by bottom surface 111.

In the confirmation, light distribution characteristic data obtained by measuring luminous intensity of light emitted from the light emitting device in directions of −90° or less and of +90° or more is used.

A light beam having the maximum luminous intensity among light beams emitted from light emitting device 130 (hereinafter also simply referred to as "light beam having the maximum luminous intensity") is preferably emitted at an angle of 85° to 95° when the direction along optical axis OA is set to 0°. When the light emission angle of the light beam having the maximum luminous intensity is in the above range, it becomes possible for the light beam having the maximum luminous intensity to reach first inclined surface 112 directly. In addition, when the direction along optical axis OA is set to 0°, angles on one of two first inclined surfaces 112 side are set to be positive and angles on the other first inclined surface 112 side are set to be negative in the cross section including optical axis OA (Z axis) and X axis, the luminous intensity of a light beam emitted at an angle in a range of −60° to 60° is preferably less than 5%, more preferably less than 3%, of the luminous intensity of the light beam having the maximum luminous intensity. A position immediately above light emitting device 130 is more likely to become bright even with a small amount of light, since the incident angle of illuminating light to light diffusion member 140 is small and the distance from light emitting device 130 to the illuminated position is short. Therefore, in order to obtain large surface light source device 100, it is preferred that light illuminating the vicinity of light emitting device 130 be minimized by causing the light to reach a light emitting surface part far from light emitting device 130. It is difficult to laterally direct all the light emitted from light emitting element 131 from light emitting device 130, and thus light, which light flux controlling member 132 cannot control, leaking in the upward direction and light being reflected by the substrate 120, and the like still exist. Therefore, some amount of light illuminating the position immediately above light emitting device 130 exists.

In addition, in the cross section perpendicular to the array direction (Y direction) of the plurality of light emitting devices 130, set as first angle θ1 is an angle between optical axis OA of light emitting element 131 and the light beam having the maximum luminous intensity, as illustrated in FIG. 2B. Set as second angle θ2 is an angle between optical axis OA of light emitting element 131 and a straight line that connects the light emission center of light emitting element 131 and the opposite end (opening side end) of first inclined surface 112 relative to bottom surface 111. In this case, first angle θ1 is larger than second angle θ2. With this configuration, the light beam having the maximum luminous intensity infallibly reaches first inclined surface 112 directly. When the first angle is smaller than the second angle, the light beam having the maximum luminous intensity disadvantageously reaches light diffusion member 140 directly. In surface light source device 100 having a smaller thickness, light beams are more likely to be emitted from the light emitting surface on light diffusion member 140 at a position close to light emitting device 130. In surface light source device 100 that is made larger, the incident angle of the light beam having the maximum luminous intensity becomes large when the light directly reaches light diffusion member 140, and thus the light, even having the maximum luminous intensity, contributes less to the luminance on the light emitting surface of light diffusion member 140. Therefore, thinner or larger surface light source device 100 with high uniformity and high light use efficiency on light diffusion member 140 cannot be obtained.

Light emitting element 131 is a light source of surface light source device 100 (and light emitting device 130). Light emitting element 131 is disposed on substrate 120. Light emitting element 131 is, for example, a light emitting diode (LED). The color of light emitted from light emitting element 131 can be appropriately set. The color of light emitted from light emitting element 131 may be white or blue. In the present embodiment, the color of light emitted from light emitting element 131 is white. The normal to the surface of substrate 120 is parallel to optical axis OA of light emitting element 131.

Light flux controlling member 132 is configured to control the light distribution of light emitted from light emitting element 131. Light flux controlling member 132 is disposed above light emitting element 131 in such a manner that central axis CA of light flux controlling member 132 coincides with optical axis OA of light emitting element 131 (see FIG. 2B). "Optical axis OA of light emitting element 131" refers to a central light beam of a stereoscopic light flux from light emitting element 131. "Central axis CA of light flux controlling member 132" refers to, for example, a symmetric axis of 2-fold rotational symmetry.

The material of light flux controlling member 132 is not limited as long as light having a desired wavelength can pass therethrough. The material of light flux controlling member 132 is, for example, a light-transmissive resin such as polymethylmethacrylate (PMMA), polycarbonate (PC) or epoxy resin (EP), or glass.

Figure 3:
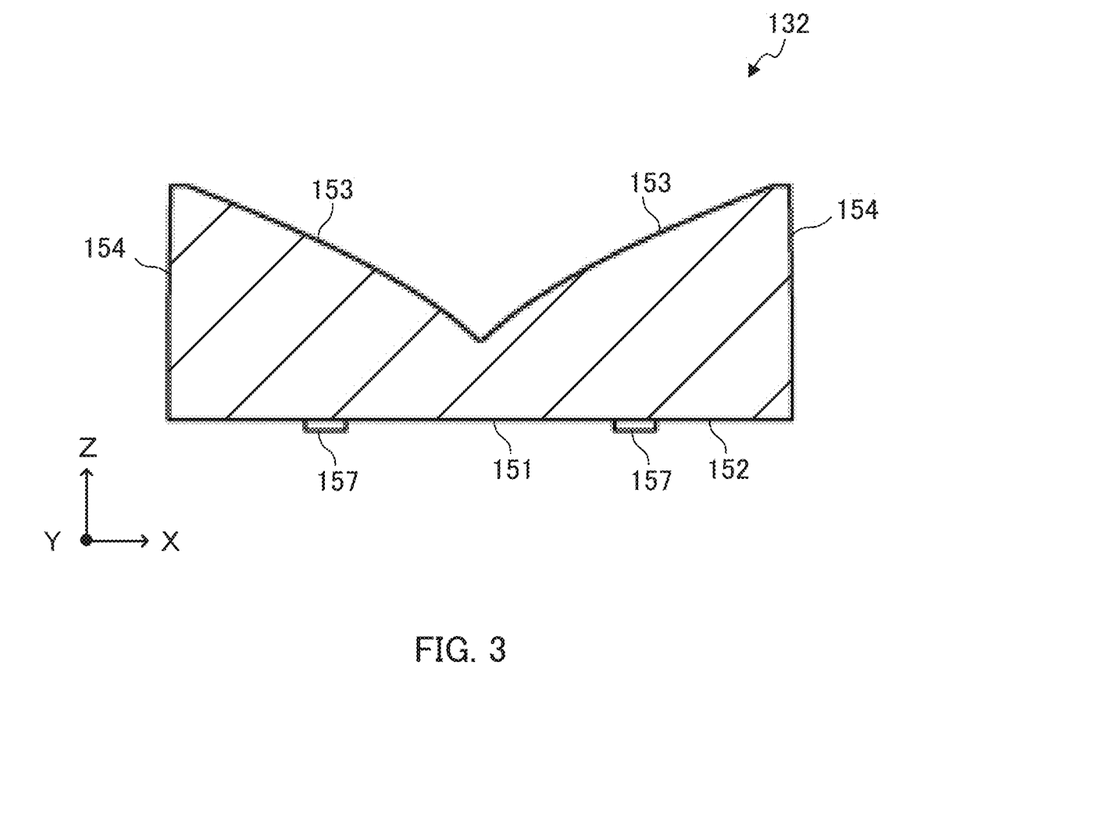
FIG. 3 is a cross-sectional view of a light flux controlling member.

FIG. 3 is a cross-sectional view of light flux controlling member 132. As illustrated in FIG. 3, light flux controlling member 132 includes incidence surface 151, rear surface 152, two reflection surfaces 153 and two emission surfaces 154. In the present embodiment, light flux controlling member 132 further includes four legs 157.

Incidence surface 151 is configured to allow light emitted from light emitting element 131 to enter the inside of light flux controlling member 132. Incidence surface 151 is disposed on the rear side of light flux controlling member 132 (substrate 120 and light emitting element 131 side) so as to intersect with optical axis OA. The shape of incidence surface 151 can be appropriately set as long as the above function can be obtained. The shape of incidence surface 151 may be that of a planar surface, or an inner surface of a recess opened on rear surface 152. In the present embodiment, the shape of incidence surface 151 is that of a planar surface. Rear surface 152, having legs 157 disposed thereon, is formed so as to surround incidence surface 151.

Two reflection surfaces 153 are disposed on the front side of light flux controlling member 132 (light diffusion member 140 side) opposite to light emitting element 131 with incidence surface 151 therebetween. Two reflection surfaces 153 are configured to reflect at least part of light incident on incidence surface 151 in the directions substantially perpendicular to optical axis OA of light emitting element 131, and substantially opposite to each other (both along X axis). Each of two reflection surfaces 153 is formed so as to become further away from X axis as the distance of reflection surface 153 from optical axis OA increases. Specifically, each of two reflection surfaces 153 is formed so that the inclination of the tangent of the reflection surface gradually decreases (so that the reflection surface is set along X axis) from optical axis OA of light emitting element 131 toward the end of the reflection surface (emission surface 154). Part of light that is emitted from light emitting element 131 and incident on incidence surface 151 is reflected by reflection surface 153 and travels toward emission surface 154. In addition, another part of the light that is emitted from light emitting element 131 and incident on incidence surface 151 (specifically light emitted from the external edge of the light emitting surface of light emitting element 131) includes a light component emitted from emission surface 154 toward the outside of light flux controlling member 132 without being reflected by reflection surface 153.

Each of two emission surfaces 154 is disposed so as to connect rear surface 152 and reflection surface 153. Emission surface 154 is configured to emit light incident on incidence surface 151 to the outside. Emission surface 154 is substantially parallel to optical axis OA. Emission surface 154 may be a planar surface or a curved surface. The phrase "substantially parallel to optical axis OA" means that, in a first virtual cross section, a smaller one of the angles between a straight line parallel to optical axis OA and emission surface 154 is 0° to 3° or less. When emission surface 154 is a curved surface, the angle is referred to, a smaller one of the angles between optical axis OA and the tangent of a curved line in the cross section including optical axis OA of emission surface 154 and X axis. In the present embodiment, emission surface 154 is a planar surface formed so as to be directed toward the rear side as the distance of emission surface 154 from optical axis OA increases in the cross section including optical axis OA and X axis.

Four legs 157 are substantially columnar members protruding from rear surface 152 toward the rear side. Legs 157 support light flux controlling member 132 at an appropriate position relative to light emitting element 131 (see FIG. 2B). Leg 157 may be used for positioning by fitting the leg into a hole formed in substrate 120. The positions, shapes and number of legs 157 are appropriately set so that legs 157 do not cause optically adverse effects as long as light flux controlling member 132 can be stably fixed on substrate 120. In the present embodiment, two legs 157 between incidence surface 151 and emission surface 154, four legs in total, are disposed in X-direction.

Light diffusion member 140 is disposed so as to cover the opening of casing 110. Light diffusion member 140 is a plate-shaped member having a light transmitting property and a light diffusing property, and allows light emitted from light emitting device 130 to pass therethrough while diffusing the light. Light diffusion member 140 may serve as the light emitting surface of surface light source device 100. Light diffusion member 140 includes, for example, a light diffusion plate or an optical sheet.

The material of light diffusion member 140 can be appropriately selected from materials that allow light emitted from light emitting device 130 to pass therethrough while diffusing the light. Examples of the materials of light diffusion member 140 include light-transmissive resins such as polymethylmethacrylate (PMMA), polycarbonate (PC), polystyrene (PS) and styrene-methylmethacrylate copolymer resin (MS). To provide a light diffusing property, fine irregularities are formed on the surface of light diffusion member 140, or light diffusion elements such as beads are dispersed in light diffusion member 140.

In surface light source device 100 according to the present embodiment, light emitted from each light emitting element 131 is converted and emitted from light flux controlling member 132 as light traveling, in particular, in two directions that are substantially perpendicular to optical axis OA of light emitting element 131 and are substantially opposite to each other (two directions along X axis in FIG. 3) so as to illuminate a wide range of light diffusion member 140. Among light beams emitted from each light flux controlling member 132, most of the light beams are reflected by first inclined surface 112, further diffused by light diffusion member 140, and emitted outside. Such a configuration can suppress luminance unevenness of surface light source device 100.

Figure 4:
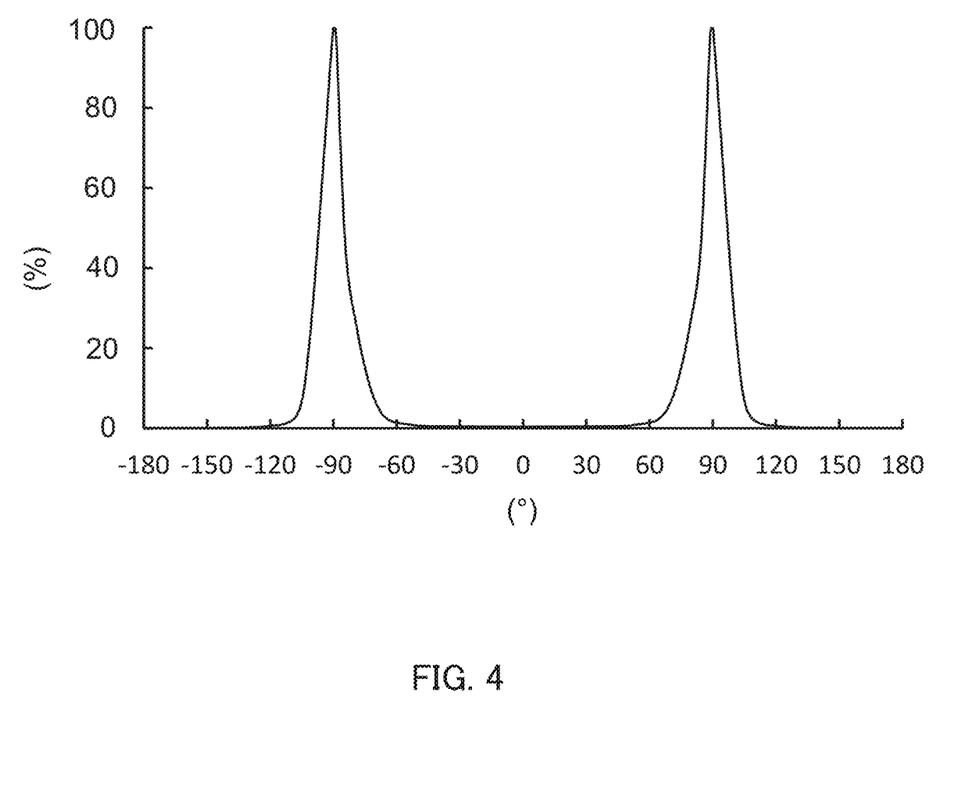
FIG. 4 is a graph showing a relationship between angles of light beams emitted from a light emitting device and relative luminous intensity of the light beams.

In the following, light distribution characteristics of light emitting device 130 of the present embodiment is analyzed. FIG. 4 is a graph showing a relationship between angles of light beams emitted from light emitting device 130 and relative luminous intensity of the light in the cross section including optical axis OA and X axis. The abscissa of FIG. 4 indicates the angle)(° with the direction along optical axis OA set as 0°. The ordinate of FIG. 4 indicates the relative luminous intensities (%) with the peak luminous intensity set as 100%.

As shown in FIG. 4, in light emitting device 130 of surface light source device 100 according to the present embodiment, the luminous intensity of a light beam traveling in the direction of approximately 90° is the highest with the direction along optical axis OA set as 0° in the cross section including optical axis OA and X axis. In addition, when the direction along optical axis OA is set to 0°, angles on one of two first inclined surfaces 112 side are set to be positive and angles on the other first inclined surface 112 side are set to be negative in the cross section including optical axis OA and X axis, the luminous intensity of a light beam in the range of −60° to 60° is 1.5% or less relative to the peak luminous intensity, and the luminous intensity observed in the range of −50° to 50° is less than 1% relative to the peak luminous intensity.

Figure 5:
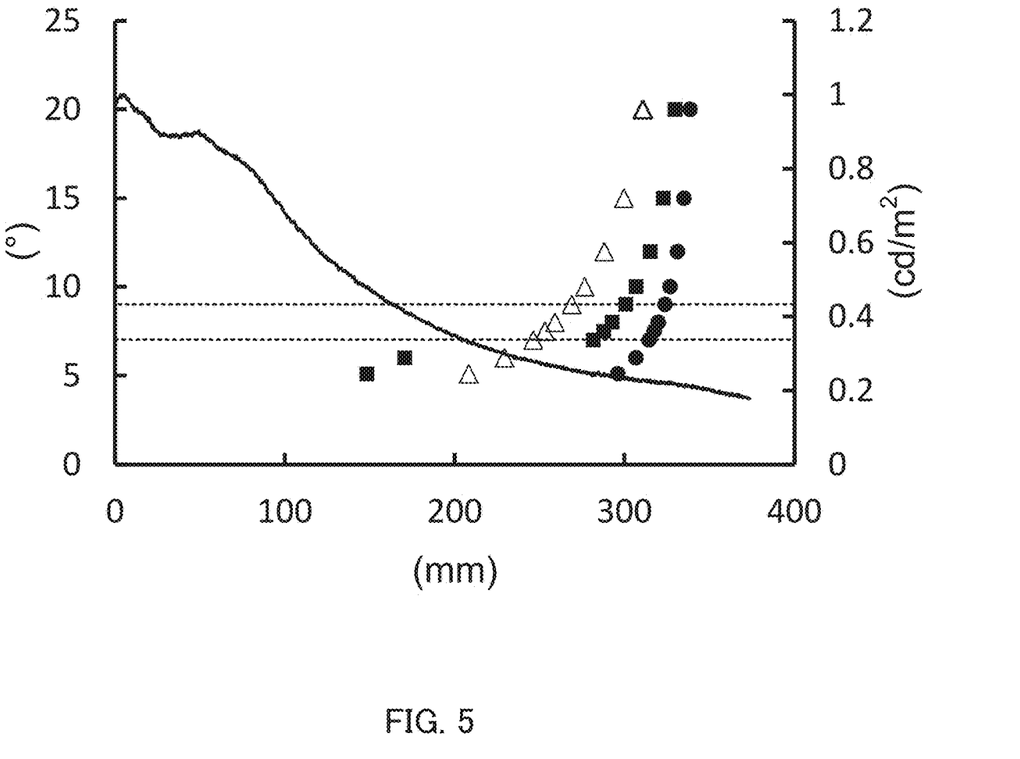
FIG. 5 is a graph showing light distribution characteristics of light beams emitted from an emission surface of the light flux controlling member.

It is then analyzed which position of light diffusion member 140 the light emitted from light emitting device 130 at a predetermined light emission angle reaches. FIG. 5 shows the relationship between distances (mm) on light diffusion member 140 from optical axis OA, inclination angles)(° of first inclined surface 112 relative to bottom surface 111, and luminance (cd/m²) on light diffusion member 140, in the cross section including optical axis OA and X axis. The abscissa of FIG. 5 is the distance (mm) on light diffusion member 140 from optical axis OA. The first ordinate shown on the right side of FIG. 5 is the luminance (cd/m²) on light diffusion member 140. The second ordinate shown on the left side of FIG. 5 is the inclination angle)(° of first inclined surface 112 relative to bottom surface 111.

The curved line of FIG. 5 shows, when it is assumed that light diffusion member 140 is illuminated only by light beams emitted from light emitting device 130 and directly reaching light diffusing member 140 without being reflected by first inclined surface 112, the distance (mm) (abscissa) of reaching positions on light diffusion member 140 from optical axis OA and the luminance (first ordinate on the right side) at the reaching positions.

As described above, part of light emitted from light emitting element 131 is emitted from reflection surface 154 toward the outside of light flux controlling member 132. Accordingly, in surface light source device 100 according to the present embodiment, the luminance distribution obtained from light emitted from light emitting device 130 and directly reaching light diffusion member 140 has the brightest part that is immediately above light emitting device 130, and parts that become less bright as the distance from optical axis OA increases, as shown by the curved line of FIG. 5.

The white triangle symbols, the black square symbols and the black circle symbols of FIG. 5 indicate changes in the reaching position of a light beam when the inclination angle of first inclined surface 112 is changed. The white triangle symbols show the relationship between the inclination angle (first ordinate on the left side) of first inclined surface 112 and the reaching position (abscissa) on light diffusion member 140 for light beams emitted from light emitting device 130 at the angle of 90° relative to optical axis OA. The black square symbols show the relationship between the inclination angle (first ordinate on the left side) of first inclined surface 112 and the reaching position (abscissa) on light diffusion member 140 for light beams emitted from light emitting device 130 at the angle of 94° relative to optical axis OA. The black circle symbols show the relationship between the inclination angle (first ordinate on the left side) of first inclined surface 112 and the reaching position (abscissa) on light diffusion member 140 for light beams emitted from light emitting device 130 at the angle of 87° relative to optical axis OA. The angles 87° and 94° are light emission angles of light beams having a light intensity of 70% of the luminous intensity of the light beam that is emitted from light emitting device 130 and has the maximum luminous intensity (light emission angle: approximately 90°). That is, the white triangle symbols, the black square symbols and the black circle symbols of FIG. 5 indicate the reaching position of the light beam having the light intensity of 70% of the maximum luminous intensity, the reaching position of the light beam having the substantially maximum luminous intensity, and the reaching position of the light beam having the light intensity of 70% of the maximum luminous intensity, respectively. The inclination angles of first inclined surface 112 relative to substrate 120 are set to 5.1°, 6.0°, 7.0°, 7.5°, 8.0°, 9.0°, 10.0°, 12.0°, 15.0° and 20.0°.

Light emitted from light emitting device 130 at a large light emission angle as indicated by the white triangle symbols, the black square symbols and the black circle symbols is reflected by first inclined surface 112 and reaches light diffusion member 140. The light reflected by first inclined surface 112 as described above preferably reaches the entire low-luminance region of the luminance distribution indicated by the curved line in FIG. 5. From such a viewpoint, the inclination angle of first inclined surface 112 is preferably in the range of 7° to 9° as shown by the broken line in FIG. 5. With the inclination angle of first inclined surface 112 in the range of 7° to 9°, light diffusion member 140 can be uniformly illuminated by light emitted from light emitting device 130 and directly reaching light diffusion member 140, and light emitted from light emitting device 130 and reaching light diffusion member 140 via first inclined surface 112. In addition, light emitted from light emitting device 130 and reaching light diffusion member 140 via substrate 120 is more likely to reach a region in light diffusion member 140 between a region where light from light emitting device 130 largely reaches directly, and a region where light largely reaches via first inclined surface 112. Accordingly, light diffusion member 140 is illuminated more uniformly.

The luminance distribution on surface light source device 100 according to the present embodiment is then analyzed. For the measurement of luminance, surface light source device 100 with only one light emitting element 131 turned on is used. The size of the light emitting surface (light diffusion member 140) of the used surface light source device 100 is 55 inches, the angle of first inclined surface 112 relative to substrate 120 is 7°, the distance between substrate 120 and light diffusion member 140 is 30 mm, and a light diffusion plate having a thickness of 2 mm with two prism sheets and one diffusion sheet sequentially disposed thereon is used as light diffusion member 140. For the comparison, luminance distribution is analyzed for a surface light source device of Comparative Example 1 having no first inclined surface 112, and a surface light source device of Comparative Example 2 with the angle of first inclined surface 112 relative to substrate 120 being 15°.

Figure 6A:
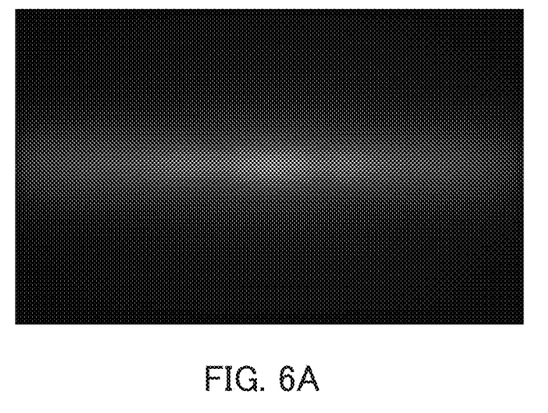
FIGS. 6A, 6B and 6C show luminance distribution in the surface light source device.
Figure 6B:
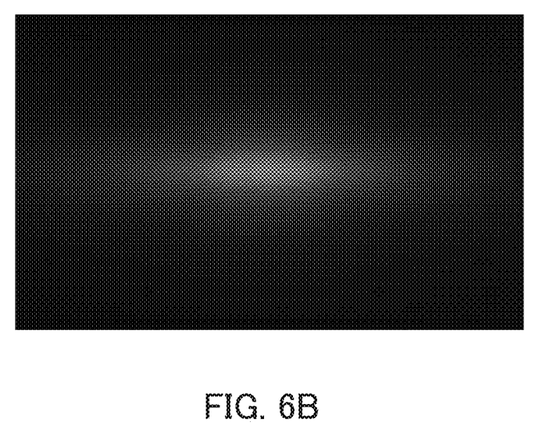
Figure 6C:
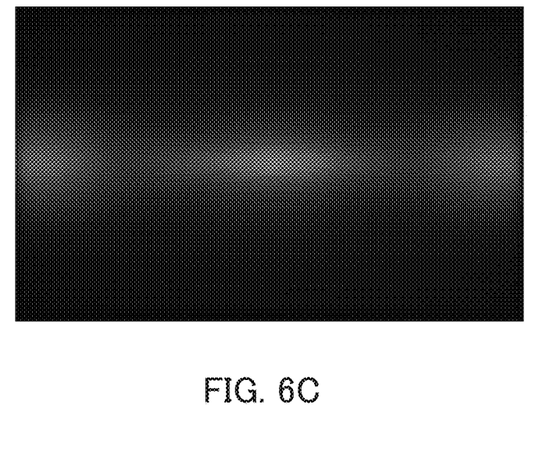

FIG. 6A shows the result of surface light source device 100 according to the present embodiment, FIG. 6B shows the result of the surface light source device according to Comparative Example 1, and FIG. 6C shows the result of the surface light source device according to Comparative Example 2. The horizontal direction in FIGS. 6A to 6C is perpendicular to the array direction of light emitting devices 130.

As shown in FIG. 6A, surface light source device 100 according to the present embodiment achieves uniform luminance in the direction perpendicular to the array direction of light emitting devices 130. The reason for the uniformity is considered to be the fact, as described above, that light emitted from light emitting device 130 and directly reaching light diffusion member 140 illuminates the vicinity of light emitting device 130 that is immediately above light emitting device 130, and light emitted from light emitting device 130 and reaching light diffusion member 140 via first inclined surface 112 is distributed to and illuminates regions other than the vicinity immediately above light emitting device 130.

As shown in FIG. 6B, the surface light source device according to Comparative Example 1 having no first inclined surface 112 has luminance that is high only at the vicinity immediately above light emitting device 130. The reason for the higher luminance only at the vicinity is considered to be the fact that since casing 110 does not include first inclined surface 112, light laterally traveling from light emitting device 130 cannot effectively illuminate light diffusion member 140.

As shown in FIG. 6C, the surface light source device according to Comparative Example 2 with the angle θ of first inclined surface 112 relative to substrate 120 being 15° generates a dark part between a position immediately above light emitting device 130 and the external edge. The reason for the generation of the dark part is considered to be the fact that since the angle of first inclined surface 112 relative to substrate 120 is too large, light beams reflected by first inclined surface 112 concentrate and illuminate the vicinity of the external edge, and light compensating for the dark part between the vicinity immediately above light emitting device 130 and the external edge of light diffusion member 140 becomes insufficient.

Figure 7:
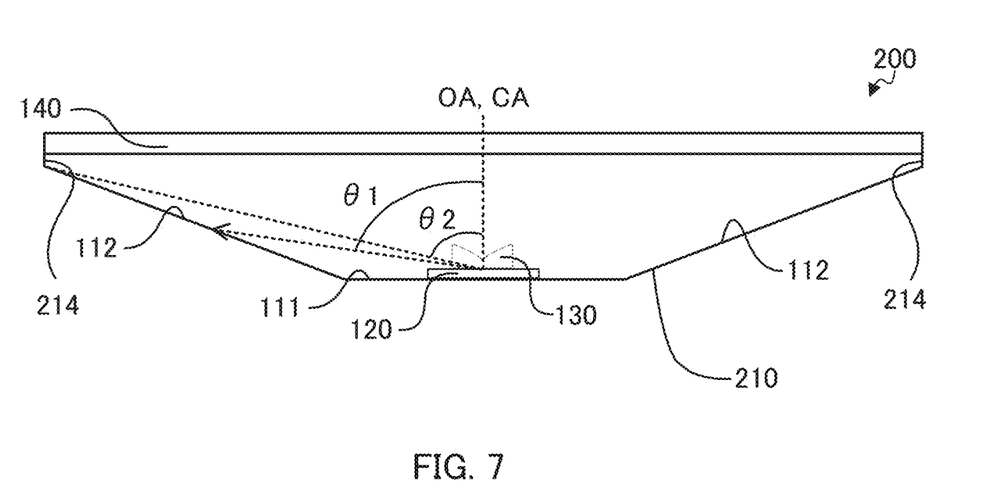
FIG. 7 is a cross-sectional view of a surface light source device for explaining a casing in another configuration.

As illustrated in FIG. 7, casing 210 of surface light source device 200 may include side surface 214 along optical axis OA at the outer end of first inclined surface 112 in the cross section perpendicular to the array direction of light emitting devices 130. The phrase "along optical axis OA" includes a case where side surface 214 is parallel to optical axis OA and a case where side surface 214 is tilted relative to optical axis OA. When side surface 214 is tilted relative to optical axis OA, the angle of side surface 214 relative to optical axis OA is preferably less than 3°. Side surface 214 is effective because, when the external edge s, particularly four corners, of light diffusion member 140 (light emitting surface) are more likely to become dark, the amount of light beams reaching the external edges or the four corners of light diffusion member 140 can be increased.

Figure 8:
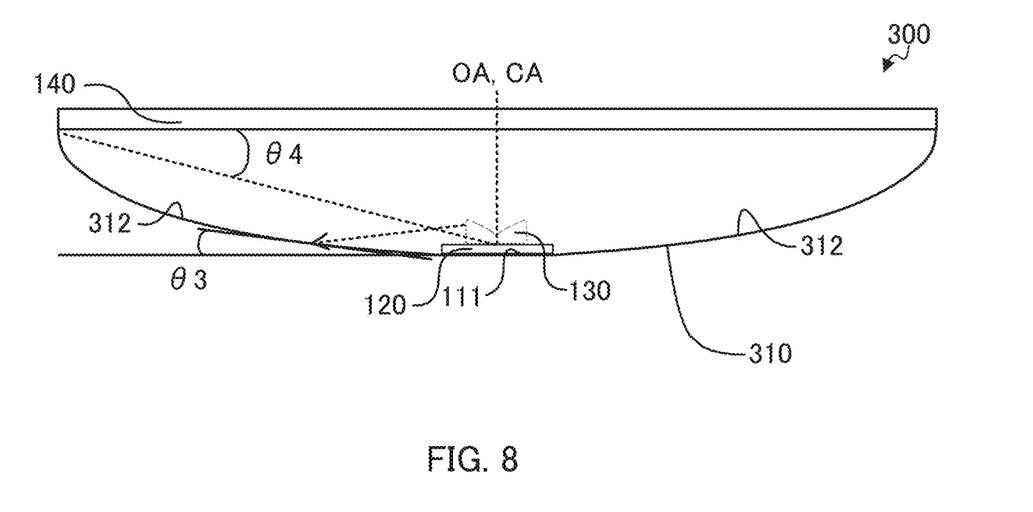
FIG. 8 is a cross-sectional view of a surface light source device according to a comparative example.

As illustrated in FIG. 8, comparative surface light source device 300 is possible in which first inclined surface 312 is, in the cross section perpendicular to the array direction of light emitting devices 130, tilted so as to approach light diffusion member 140 as the distance of first inclined surface 312 from optical axis OA increases. In surface light source device 300, first inclined surface 312 is a curved surface that is concave relative to light diffusion member 140. In the light distribution characteristics of light emitting device 130, a light beam having the largest angle relative to optical axis OA in the angle range in which luminous intensities of 70% or more of the maximum luminous intensity are shown reaches first inclined surface 312. In the cross section perpendicular to the array direction of light emitting devices 130, angle $\theta 3$ is smaller than angle $\theta 4$ where angle $\theta 3$ is an angle between a straight line perpendicular to optical axis OA of light emitting element 131 (a straight line parallel to light diffusion member 140) and first inclined surface 312 where a light beam having the largest angle relative to optical axis OA in the angle range in which luminous intensities of 70% or more of the maximum luminous intensity are shown reaches, and angle $\theta 4$ is an angle between the straight line perpendicular to optical axis OA of light emitting element 131 (the straight line parallel to light diffusion member 140) and a straight line that connects the light emission center of light emitting element 131 and the opening side end of casing 310. Since first inclined surface 312 is a curved surface, "$\theta 3$" is set to be an angle between the straight line perpendicular to optical axis OA of light emitting element 131 and the tangent of the curved surface at the position where a light beam having the largest angle relative to optical axis OA in the angle range in which luminous intensities of 70% or more of the maximum luminous intensity are shown reaches. The comparative surface light source device using such casing 310 cannot obtain the effect of the present invention even though light emitting device 130 with light distribution characteristics having a sharp peak as in the present invention is used. In order to obtain an effect similar to that of the present invention in the surface light source device having a casing in which $\theta 3$ changes continuously as the distance from optical axis OA increases, $\theta 3$ should be larger than $\theta 4$.

(Effects)

As described above, in surface light source devices 100 and 200 according to the present embodiment, light emitted from light emitting device 130 and directly reaching light diffusion member 140 mainly illuminates the central part of light diffusion member 140, light emitted from light emitting device 130 and reflected by substrate 120 illuminates a part slightly outside the central part of light diffusion member 140, and light emitted from light emitting device 130 and reflected by first inclined surface 112 illuminates an outer part of light diffusion member 140, thereby illuminating the entire light diffusion member 140 uniformly.

This application claims priority based on Japanese Patent Applications No. 2017-185192 filed on Sep. 26, 2017 and 2017-219986 filed on Nov. 15, 2017, the entire contents of which including the specifications and the drawings are incorporated herein by reference.

INDUSTRIAL APPLICABILITY

The surface light source device according to the present invention is applicable to, for example, a backlight of a liquid crystal display device, a sign board, a commonly used illumination apparatus or the like.

REFERENCE SIGNS LIST 100, 200, 300 Surface light source device
100' Display device
107 Member to be irradiated
110, 210, 310 Casing
111 Bottom surface
112, 312 First inclined surface
113 Second inclined surface
120 Substrate
130 Light emitting device
131 Light emitting element
132 Light flux controlling member
140 Light diffusion member
151 Incidence surface
152 Rear surface
153 Reflection surface
154 Emission surface
157 Leg
214 Side surface
OA Optical axis
CA Central axis

What is claimed is:

1. A surface light source device comprising:
a casing with an opening, the casing having a shape of a box; a substrate disposed in the casing; a plurality of light emitting devices arranged in one direction on the substrate; and a light diffusion member disposed so as to cover the opening,
wherein the plurality of light emitting devices each include:
a light emitting element, and
a light flux controlling member configured to control light distribution of light emitted from the light emitting element;
wherein the casing includes:
a bottom surface on which the substrate is disposed, and
inclined surfaces which are disposed parallel to an array direction of the plurality of light emitting devices, the inclined surfaces being disposed on both sides of the bottom surface respectively;
wherein the light flux controlling member includes:
an incidence surface disposed on a rear side so as to intersect with the optical axis of the light emitting element, the incidence surface being configured to allow incidence of the light emitted from the light emitting element;
two reflection surfaces disposed on a front side and configured to reflect part of the light incident on the incidence surface in directions substantially perpendicular to the optical axis of the light emitting element, respectively, the directions being substantially opposite to each other; and
two emission surfaces emitting to an outside the light reflected by the two reflection surfaces, respectively, and emitting to the outside the light incident on the incidence surface, the two emission surfaces being disposed so as to face each other in a direction perpendicular to the optical axis and perpendicular to the array direction of the plurality of light emitting devices with the two reflection surfaces between the two emission surfaces;
wherein:
in a cross section perpendicular to the array direction of the plurality of light emitting devices, each of the inclined surfaces is tilted so as to approach the light diffusion member as a distance of the inclined surface from the bottom surface increases,
a light beam reaches the inclined surface directly, or is reflected once by the bottom surface and subsequently reaches the inclined surface, the light beam having a largest angle relative to an optical axis of the light emitting element in an angle range in which luminous intensities of 70% or more of a maximum luminous intensity are shown in light distribution characteristics of each of the light emitting devices, and
a first angle is larger than a second angle, the first angle being an angle between the optical axis of the light emitting element and a light beam which is emitted from the light emitting device and has the maximum luminous intensity, the second angle being an angle between the optical axis of the light emitting element and a straight line that connects a light emission center of the light emitting element and an opening side end of the inclined surface.

2. The surface light source device according to claim 1, wherein the plurality of light emitting devices are arranged on the substrate in one row.

3. The surface light source device according to claim 1, wherein each of the two inclined surfaces is a planar surface.

4. The surface light source device according to claim 1, wherein a normal to a surface of the substrate is parallel to the optical axis of the light emitting element.

5. A display device comprising:
the surface light source device according to claim 1, and
a display member disposed on the light diffusion member.

* * * * *